(12) United States Patent
Cheng et al.

(10) Patent No.: US 12,721,396 B2
(45) Date of Patent: Sep. 1, 2026

(54) OBLIQUE IMPACT PROTECTION TECHNOLOGY, HELMET CONTAINING, SPORTS EQUIPMENT CONTAINING, AND PROCESS THEREFOR

(71) Applicant: STRATEGIC SPORTS LIMITED, Hong Kong (HK)

(72) Inventors: Tien Hou Cheng, Hong Kong (HK); Michael Ming-Jae Lin, Hong Kong (HK)

(73) Assignee: STRATEGIC SPORTS LIMITED, Pok Fu Lam (HK)

( * ) Notice: Subject to any disclaimer, the term of this patent is extended or adjusted under 35 U.S.C. 154(b) by 1177 days.

(21) Appl. No.: 17/297,889

(22) PCT Filed: Sep. 3, 2020

(86) PCT No.: PCT/CN2020/113232

§ 371 (c)(1), (2) Date: May 27, 2021

(87) PCT Pub. No.: WO2021/043207

PCT Pub. Date: Mar. 11, 2021

(65) Prior Publication Data

US 2023/0000195 A1 Jan. 5, 2023

(30) Foreign Application Priority Data

Sep. 3, 2019 (HK) ................................ 19129096.4
Dec. 19, 2019 (HK) .......................... 32019000081.2

(51) Int. Cl.
*A42B 3/12* (2006.01)
*B32B 3/26* (2006.01)
*B32B 5/18* (2006.01)

(52) U.S. Cl.
CPC .............. *A42B 3/125* (2013.01); *B32B 3/266* (2013.01); *B32B 5/18* (2013.01); *B32B 2266/02* (2013.01);
(Continued)

(58) Field of Classification Search
CPC .... A41D 13/0156; A42B 3/064; A42B 3/124; A42B 3/125; B32B 3/266; B32B 5/18;
(Continued)

(56) References Cited

U.S. PATENT DOCUMENTS 6,093,468 A 7/2000 Toms et al.
6,617,002 B2 * 9/2003 Wood .................... G10K 11/16 428/137
(Continued)

FOREIGN PATENT DOCUMENTS

CN 104159463 A 11/2014
CN 108471829 A 8/2018
(Continued)

OTHER PUBLICATIONS

CN-208510168-U, Yu-Huan Wang, Feb. 19, 2019. (Year: 2019).*
(Continued)

*Primary Examiner* — Hai Vo
(74) *Attorney, Agent, or Firm* — Daniel F. Nesbitt; Nesbitt IP LLC

(57) ABSTRACT

An oblique-impact protection technology member (20) contains a layer (50) of closed cell foam containing a first surface (52), a second surface (54), and a plurality of wells (56) on the first surface (52). The first surface (52) contains a plurality of first surface apertures (58) and the first surface apertures (58) have a square shape. The second surface (54) is opposite the first surface (52) and optionally contains a plurality of second surface apertures (62). Each well (56) corresponds to a first surface aperture (58) and the second
(Continued)

surface (54) is substantially parallel; or parallel, to the first surface (52). A helmet (10) and/or a piece of sporting equipment (12) may contain this technology, and a process may manufacture this technology.

18 Claims, 4 Drawing Sheets

(52) U.S. Cl.
CPC ..... *B32B 2266/08* (2013.01); *B32B 2307/558* (2013.01); *B32B 2437/04* (2013.01)

(58) Field of Classification Search
CPC ............ B32B 2266/02; B32B 2266/08; B32B 2307/558; B32B 2437/04
See application file for complete search history.

(56) References Cited

U.S. PATENT DOCUMENTS

| | | | | |
|---|---|---|---|---|
| 9,572,390 | B1 | 2/2017 | Simpson | |
| D974,669 | S | 1/2023 | Cheng | |
| 2002/0120978 | A1* | 9/2002 | Moore, III | A42B 3/125 2/412 |
| 2009/0038883 | A1* | 2/2009 | Kim | E04B 1/86 181/291 |
| 2010/0307867 | A1* | 12/2010 | Ogawa | B32B 5/26 181/288 |
| 2011/0209275 | A1* | 9/2011 | Berns | B32B 38/185 2/455 |
| 2014/0182049 | A1* | 7/2014 | Prust | A42B 3/12 36/43 |
| 2014/0373476 | A1* | 12/2014 | Curtis | E04F 15/225 52/480 |
| 2015/0113709 | A1 | 4/2015 | Cheng | |
| 2017/0013907 | A1 | 1/2017 | Salmini et al. | |
| 2017/0105461 | A1* | 4/2017 | Hancock | A42B 3/125 |
| 2017/0196291 | A1 | 7/2017 | Glover et al. | |
| 2018/0049485 | A1 | 2/2018 | Markison | |
| 2018/0153244 | A1 | 6/2018 | Kirshon | |
| 2019/0343214 | A1* | 11/2019 | Krynock | A42B 3/128 |

FOREIGN PATENT DOCUMENTS

| | | | |
|---|---|---|---|
| CN | 208510168 | U * | 2/2019 |
| CN | 110167377 | A | 8/2019 |
| EP | 3566600 | A1 | 11/2019 |

OTHER PUBLICATIONS

Office Action dated Oct. 31, 2022 in related Japanese Application No. 2021-525323 filed Nov. 20, 2020 (4 pages) with JPO machine translation (5 pages).
United Nations, "Addendum 21: Regulation No. 22, Revision 4—Uniform Provisions Concerning the Approval of Protective Helmets and their Visors for Drivers and Passengers of Motor Cycles and Mopeds", E/ECE/TRANS/505, Sep. 24, 2002 (110 pages).
"AS/NZS 1698:2006—Protective helmets for vehicle users", Australian/New Zealand Standard, Feb. 20, 2006 (16 pages).
"BS EN 1077:2007—Helmets for Alpine Skiers and Snowboarders", British Standards Institution, 2007, English version (22 pages) (equivalent to "CSN EN 1077:2007").
"JIS 8133:2007—Protective Helmets for Drivers and Passengers", Japan Standards Association, 2007 (37 pages) (with Google machine translation, 32 pages).
"Amendment No. 1 to AS/NZS 1698:2006—Protective helmets for vehicle users", Australian/New Zealand Standard, Sep. 28, 2007 (1 page).
"2010 Standard for Protective Headgear", Snell Memorial Foundation Inc., 2008 (21 pages).
"Amendment No. 2 to AS/NZS 1698:2006—Protective helmets for vehicle users", Australian/New Zealand Standard, May 27, 2009 (3 pages).
"Koroyd", Koroyd SARL, May 13, 2010 according to Wayback Machine, https://www.koroyd.com (1 page).
"GB 811-2010—Helmets for motorcyclists (Translated English of Chinese Standard)", National Standard of the People's Republic of China, Nov. 10, 2010 (30 pages).
"Leatt", Leatt Corporation, Mar. 16, 2011 according to Wayback Machine, https://www.leatt.com (2 pages).
"Kali Protectives", Kali Protectives, Mar. 24, 2011 according to Wayback Machine, https://kaliprotectives.com/ (1 page).
US Department of Transportation (DOT), "NHTSA Laboratory Test Procedures for FMVSS No. 218—Motorcycle Helmets", DOT Office of Vehicle Safety Compliance, May 13, 2011 (76 pages).
"POC Lab", POC Sweden AB, Dec. 30, 2011 according to Wayback Machine, https://www.pocsports.com/ (2 pages).
"BS EN 1078:2012+A1:2012—Helmets for Pedal Cyclists and for Users of Skateboards and Roller Skates", British Standards Institution, 2013, English version (28 pages) (equivalent to "CSN EN 1078:2012+A1:2012").
"BS EN 1384:2017—Helmets for Equestrian Activities", British Standards Institution, 2017, English version (preview—8 pages) (equivalent to CSN EN 1384:2017).
Trek Bikes, Trek Bikes Corporation, Nov. 19, 2015 according to Wayback Machine, https://www.trekbikes.com/us/en_US/ (11 pages).
ODS (Omni-Directional Suspension), 6D Helmets, Jul. 13, 2016 according to Wayback Machine, https://www.6dhelmets.com/innovation/ (7 pages).
MIPS (Multi-directional Impact Protection System), MIPS AB, Aug. 8, 2016 according to Wayback Machine, https://mipsprotection.com (3 pages).
"Shred Optics", Shred Optics, Nov. 18, 2016 according to Wayback Machine, https://www.shredoptics.com/ (5 pages).
"1002 MAU 1006/CF/ALU—Monorail shock absorption test equipment", AD Engineering SRL, Mar. 22, 2017 according to Wayback Machine, http://www.adengin.it/en/products/2_1002_MAU_1006_CF_ALU__Monorail_shock_ab (1 page).
Morgan, Jessie-May, "Fluid Inside and Fox Racing release (r)evolutionary Rampage Pro Carbon Helment", BikeRumor, May 20, 2019, https://bikerumor.com/2019/05/20/fluid-inside-and-fox-racing-release-revolutionary-rampage-pro-carbon-helmet/ (7 pages).
Miller, Matt, "7 Rotational Impact and Concussion Prevention Technologies for MTB Helmets [Round Up]", Singletracks Blog, Blue Spruce Ventures LLC, Jul. 1, 2019, https://www.singletracks.com/mtb-gear/most-of-the-new-helmet-technologies-are-more-alike-than-different/ (14 pages).
Branch, Ben, "Fox Racing V3 Helmet—Featuring Fluid Inside™ Technology to Reduce Rotational Energy in an Impact", Silodrome, Jul. 11, 2019, https://silodrome.com/fox-racing-v3-helmet/ (10 pages).
Wirth, Mike, "Kali Invader Helmet Review", The Loam Wolf, Apr. 21, 2020, https://theloamwolf.com/2020/04/21/review-kali-invader-helmet/ (8 pages).
International Search Report and Written Opinion by the China National Intellectual Property Administration (as International Searching Authority), mailed Dec. 7, 2020, for related International Application No. PCT/US2020/113232, filed Sep. 3, 2020 (10 pages).
Kesteven, Guy, "Leatt MTB 4.0 Enduro V21 Review", Bike Perfect, Mar. 26, 2021, https://www.bikeperfect.com/reviews/leatt-mtb-40-enduro-v21-review (15 pages).
"Helmet MTB 4.0 Enduro V21", Leatt Corporation, obtained Sep. 14, 2021, https://leatt.com/us/shop/mtb/protection/helmets/helmet-mtb-4-0-v21-sku-1021000560-W?selected-color=5554 (4 pages).
Extended European Search Report dated Sep. 15, 2022 in related European Application No. 20859818.5 filed Jun. 10, 2021 (8 pages).
First Office Action dated Jun. 27, 2024 in related European Application No. 20859818.5 filed Sep. 3, 2020 (4 pages).

* cited by examiner

OBLIQUE IMPACT PROTECTION TECHNOLOGY, HELMET CONTAINING, SPORTS EQUIPMENT CONTAINING, AND PROCESS THEREFOR

CROSS-REFERENCE TO RELATED APPLICATIONS

The present application is a National Stage Entry of International Application Number PCT/CN2020/113232, filed Sep. 3, 2020, which claims the benefit of both Hong Kong Application Number 19129096.4, filed Sep. 3, 2019, and Hong Kong Application Number 32019000081.2, filed Dec. 19, 2019, the disclosures of which are hereby incorporated by reference in their entireties.

FIELD OF THE INVENTION

The present invention relates to technologies for protecting from oblique impacts, helmets containing such technologies, and manufacturing methods therefor.

BACKGROUND

Helmets are commonly used to protect the head of the user from impacts and potential damage caused by accidents, etc. Helmets may be for specific situations such as sports helmets, are well-known for use in maximize impact head protection in, for example, skiing, bicycling, water sports, motorcycle and scooter riding, car racing, horse riding, motocross/BMX. American Football, snowboarding, boxing, skateboarding rugby, etc. Other helmets may be worn for protection in potentially-hazardous situations, for example, construction sites, accident and natural disaster sites, combat, fire-fighting, police actions, riots (riot helmets), etc. In other cases, helmets may be worn to help properly-shape the head of an infant (a cranial orthosis) as he/she grows, such as in the case where a baby is born with a flat spot or other head shape deformity (i.e., positional plagiocephaly), and/or in the case where the cranial plates improperly fuse causing craniosynostosis.

Processes for making helmets, are well known and typically involve the use of a hollow mould into which an expandable material, such as a foam and/or a foam precursor is added. The mould is typically heated up prior to or during the process, and often a vacuum is applied to help expand the foam and/or foam precursor. Various processes are known to make foam items, foam helmets, etc. such as in-moulding, also known as injection-moulding and co-injection moulding steam chest moulding, steam press moulding, etc. For example, in-moulding is well-known in the art of helmet making for combining a hard outer shell with an inner polystyrene shape. Processes are known for adding an outer shell; or a lacquered outer shell, to a styrofoam, polystyrene foam, or other foam helmet. Some processes apply different materials into the mould at the same time (see, for example, US 2015/01137709 A1 to Cheng, published on Apr. 30, 2015, which is incorporated herein by reference in its entirety) in an in-moulding process, while other traditional processes first form the pieces separately and then affix them together afterwards.

Furthermore, there are various helmet standards worldwide for bicycle helmets, motorcycle helmets, etc. For example, European Uniform Protective Helmet Standard ECE 22.05 (a.k.a., "Regulation No. 22") may be found here: http://www.unece.org/trans/main/wp29/wp29regs21-40.html, European CSN Engineering Standard EN 1077 for Helmets for Alpine Skiers and Snowboarders (see: https://www.en-standard.eu/csn-en-1077-helmets-for-alpine-skiers-and-snowboarders/), European CSN Engineering Standard EN 1078 for Helmets for Pedal Cyclists, Skateboarders. and Roller Skates (see: https://www.en-standard.eu/csn-en-1078-al-helmets-for-pedal-cyclists-and-for-users-of-skateboards-and-roller-skates/), European CNS European Engineering Standard EN 1384 for Helmets for Equestrian Activities (see: https://www.en-standard.eu/csn-en-1384-helmets-for-equestrian-activities/), etc. In addition, the US Department of Transportation (DOT) has separate standards such as, for example, Federal Motor Vehicle Safety Standard No. 218 (a.k.a., "49 CFR 571.218", "FMVSS 218", etc.) related to Motorcycle Helmets (see: https://www.nhtsa.gov/document/tp-218-07pdf). Japanese standards include, for example, JSA JIS 8133-2007 for Protective Helmets for Drivers and Passengers (see: http://www.freestd.us/soft/136571.htm). In addition, additional national standards are known in the art, such as the Australian and Chinese helmet standards. Finally, the Snell Memorial Foundation also issues its own standards, for example, M2010 for motorcycle helmets.

In such tests, a helmet to be tested is typically dropped at a given speed onto a variety of anvils that are used to simulate the impact of the helmet onto different surfaces. For example, a flat anvil mimics the helmet hitting the flat pavement, while a hemispherical anvil or an angled anvil mimics the helmet hitting a curb on the side of the road. They type of anvil, the impact speed/force, duration, etc. are all described in the specific tests described above.

Equipment suitable for testing helmets according to the ECE, EN, and/or JIS tests include, for example, the 1002 MAU 1006/CF/ALU—Monorail shock absorption test equipment available from AD Engineering s.r.l., of Bergamo Italy. See, for example: http://www.adengin.it/en/products/2_1002_MAU_1006_CF_ALU_Monorail_shock_ab.

However, it has been increasingly found that the types of impacts in the flat and hemispherical anvils described above are insufficient to adequately account for real-word conditions. Accordingly, there has been an increasing amount of attention being paid to protecting people from oblique impacts. The rationale is that the current testing methods and requirements for flat and hemispherical anvils only represent impacts which occur when the helmet hits the pavement at a 90° angle, and when the helmet hits the curb. However, it is increasingly recognized that a majority of impacts occur when the helmet hits the pavement at an oblique angle. Furthermore, it is increasingly recognized that significant injury to soft tissue and spinal vertebrae may be cause by the torque transmitted in such oblique impacts and therefore oblique impacts are a greater threat than previously appreciated.

Accordingly, a variety of new helmet technologies have being developed to address the dangers of oblique impacts (see, for example, https://www.singletracks.com/blog/mtb-gear/most-of-the-new-helmet-technologies-are-more-alike-than-different/). A recent MIPS (Multi-directional Impact Protection System, see https://mipsprotection.com) helmet includes a low-friction, slightly movable frame/layer between the inner helmet surface and the user's (i.e., the wearer's) head. By allowing a slight slippage of the helmet relative to the user's head at the moment of impact, the MIPS system allegedly provides improved protection against oblique impacts as a reduced force is transmitted to the user. While MIPS is currently the gold standard for oblique impact protection, it is solely-designed for oblique impact protection and does not in-and-of-itself significantly protect against direct vertical impacts.

Bontrager's WaveCel (https://wavecel.trekbikes.com/us/en_US/) is a technology formed of a collapsible open cell structure which allegedly performs better than MIPS, supposedly due to its collapsability. However, these claims are currently disputed by MIPs and other industry players.

Koroyd employs dual-core straw-like material to form crumple-zones in the helmet which protect against various impacts. This technology may be used in combination with MIPS, for example.

Other technologies to achieve a similar effect include the SPIN (Shearing Pad INside) rotational protection system, which attaches silicone gel pads between the inner helmet surface and the user's head. These gel pads allegedly allow the helmet to shear in any direction during an oblique impact, again reducing the impact force transmitted to the user's head. In contrast, the Fluid system by Fox attempts to mimic the properties of cerebral spinal fluid with Fluid pods in the helmet so as to reduce the damage due to oblique impacts.

Kali and Leatt use the Armourgel material, a shock-absorbing smart material which absorbs impact force and also flexes to allow lower transmission of oblique impact force. Kali employs Amourgel to form their LDL (Low Density Layer), which is shaped as strips containing small cups which harden during impact. The 360° Turbine technology by Leatt employs small formed blue Amourgel foam discs located at strategic head locations to allegedly allow both cushioning for direct impacts and slippage to reduce the force transmitted to the user in oblique impacts.

6D Helmet's ODS (Omni-Directional Suspension, see, for example: https://www.6dhelmets.com/innovation/) essentially forms 2 concentric helmets having a suspension layer therebetween. The ODS system allegedly provides the user with both linear as well as oblique impact protection. However, such a system entails significant manufacturing complexity as well as essentially making 2 separate helmets with close tolerances. Accordingly, such a helmet may be expensive, difficult to manufacture, thicker and bulky.

Shred employs strategically-placed discs which allegedly reduce the rotational impact force transmitted to the user in oblique impacts.

However, the current systems suffer from various disadvantages such as, for example, increased cost, increased raw materials, increased manufacturing complexity, increased weight, complexity, reduced ventilation, reduced flexibility, and/or discomfort. Accordingly, there remains a need for improved helmets and improved helmet-forming processes which address the problems with oblique impacts.

SUMMARY OF THE INVENTION

An embodiment of the present invention relates to an oblique-impact protection technology containing a layer of closed cell foam containing a first surface, a second surface, and a plurality of wells on the first surface. The first surface contains a plurality of first surface apertures and the first surface apertures have a square shape. The second surface is opposite the first surface and optionally contains a plurality of second surface apertures. Each well corresponds to a first surface aperture and the second surface is substantially parallel; or parallel, to the second surface.

An embodiment of the present invention relates to a helmet containing a oblique-impact protection technology.

An embodiment of the present invention relates to a piece of sports equipment comprising the oblique-impact protection technology.

An embodiment of the present invention relates to a process for manufacturing a helmet by providing a female mould portion, providing a male mould portion, providing an oblique-impact protection technology member containing the oblique-impact protection technology herein, and providing an impact-dissipating material. The male mould portion is complementary to the female mould portion and therefore the female mould portion and the male mould portion are able to be fit together so that they form a hollow mould therebetween. Either before the male mould portion and the female mould portions are fitted together, or after the male mould portion and the female mould portions are fitted together the oblique-impact protection technology member is applied to the male portion. In the manufacturing process, the impact-dissipating material is applied to the hollow mould in the form of a liquid or a plurality of beads; or as a plurality of beads. The oblique-impact protection technology member and the impact-dissipating material are subject to an in-moulding process within the hollow mould. In the process herein the impact dissipating material forms an impact-dissipating member having an impact-dissipating member inner side and an impact-dissipating member outer side opposite from the impact dissipating member inner side. The in-moulding process permanently binds the oblique-impact protection technology member, typically the outer side of the oblique-impact protection technology member, to the impact-dissipating member inner side.

Without intending to be limited by theory, it is believed that the invention herein may reduce potential trauma to the head, spine, skeleton and/or soft tissues by reducing the amount of force and/or torque transmitted to the user's body; or head, during an oblique impact event. Specifically, it is believed that the texture of the first surface containing the plurality of wells allow the layer of closed cell foam to both provide a comfortable fit, as well as allowing side and lateral flexing of the layer. This in turn allows the layer to reduce the rotation and/or torque of the helmet before it transmits the resulting force and/or torque to the user's head. It is also believed that the present invention may provide significant protection from both oblique impacts as well as traditional (i.e., 90°) impacts. In addition, it is believed that the invention provides significant; or improved, protection, while simultaneously reducing raw materials, reducing manufacturing complexity, reducing cost, reducing waste, reducing manufacturing time per helmet, improving breathability and/or ventilation for the user, etc. In addition, it is believed that the present oblique-impact protection technology may be extremely flexible in that one skilled in the art may be able to widely-apply it to a variety of helmets, pieces of sports equipment, etc. with little or no additional modifications needed thereto.

Figure 1:
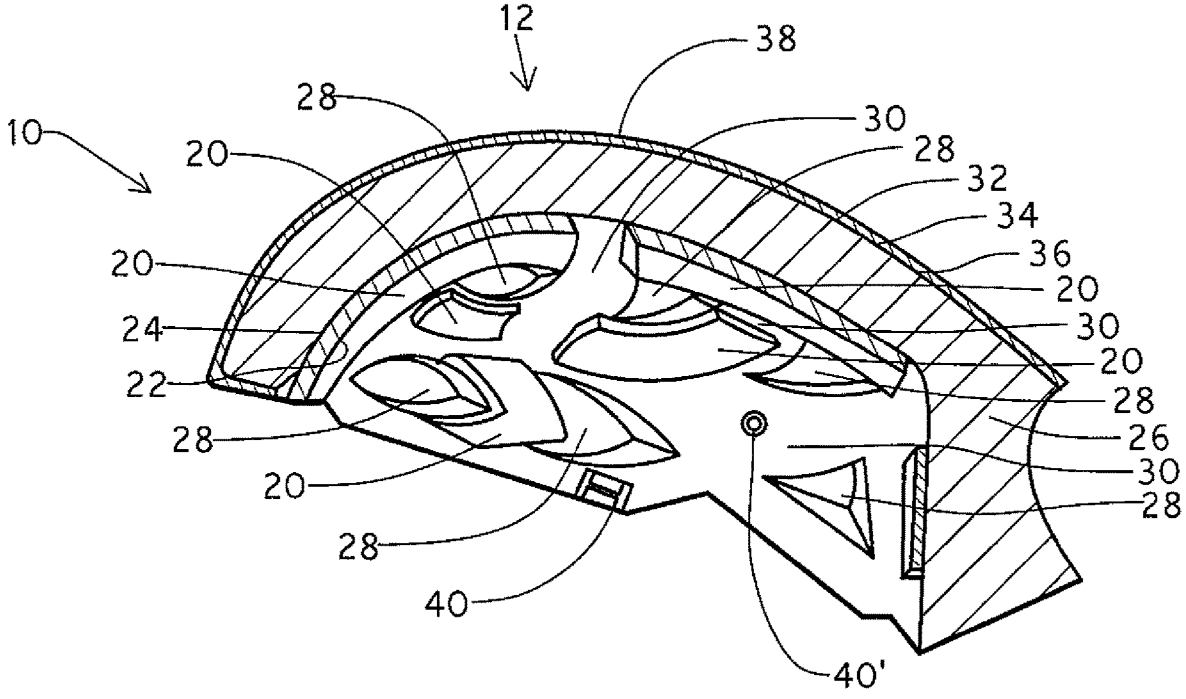
FIG. 1 shows a cut-away side view of an embodiment of a helmet, 10, according to the present invention.

The figures herein are for illustrative purposes only and are not necessarily drawn to scale.

DESCRIPTION OF THE PREFERRED EMBODIMENTS

Unless otherwise specifically provided, all tests herein are conducted at standard conditions which include a room and testing temperature of 25° C. sea level (I atm.) pressure, and pH 7, if relevant, and all measurements are made in metric units. Furthermore, all percentages, ratios, etc. herein are by weight, unless specifically indicated otherwise. It is understood that unless otherwise specifically noted, the materials, ingredients, compounds, chemicals, etc. described herein are typically commodity items and/or industry-standard items available from a variety of suppliers worldwide.

Unless otherwise explicitly indicated, as used herein with respect to a helmet, the terms "inner" and "inside" indicate a relative position towards the helmet portion which is or would be closer to the wearer's head. Unless otherwise explicitly indicated, as used herein the term "outer" and "external" indicate a relative position towards the helmet portion which is or would be closer to the outside of a helmet which is or would be away from the wearer's head.

An embodiment of the present invention relates to an oblique-impact protection technology containing a layer of closed cell foam containing a first surface, a second surface, and a plurality of wells on the first surface. The first surface contains a plurality of first surface apertures and the first surface apertures have a square shape. The second surface is opposite the first surface and optionally contains a plurality of second surface apertures. Each well corresponds to a first surface aperture and the second surface is substantially parallel; or parallel, to the second surface.

Without intending to be limited by theory, it is believed that the invention herein may reduce potential trauma to the head, spine, skeleton and/or soft tissues by reducing the amount of force and/or torque transmitted to the user's body; or head, during an oblique impact event as well as during a traditional (i.e., 90°) impact. Specifically, it is believed that the texture of the first surface containing the plurality of wells allow the layer of closed cell foam to both provide a comfortable fit, as well as allowing side and lateral flexing of the layer. This in turn allows the layer to reduce the rotation and/or torque of the helmet before it transmits the resulting force and/or torque to the user's head.

Furthermore, it is understood that the first surface often is in contact with the user's body; or head, during use. It has been discovered that if the first surface possesses to large of a surface area, then the layer may not significantly reduce the force and/or torque transmitted to the user's body; or head. Accordingly, it is believed that the design of the present invention is optimized such that the first surface gently grips the user's head while the well walls may compress and/or flex so as to absorb some part of the total force from an oblique impact. This is turn is believed to reduce the total amount of force and/or torque transmitted to the user's body; or head during an accident.

The closed cell foam useful herein typically is a blown foam which contains a plurality of closed cells. The closed cell foam typically contains a close cell foam material selected from the group of a foam rubber, a polyurethane foam, a polyethylene foam, an ethylene vinyl acetate foam, a latex foam, a polyvinyl chloride foam, a vinyl nitrile foam, and a combination thereof; or an acrylic polyethylene foam, a polyurethane foam, an ethylene vinyl acetate foam; a polyvinyl chloride foam, a vinyl nitrile foam, and a combination thereof; or a polyurethane foam, a latex foam, a rubber foam, a polyvinyl chloride foam, a vinyl nitrile foam, and a combination thereof; or a vinyl nitrile foam.

The closed cell foam material typically has a melting point from about 60° C. to about 250° C.; or from about 80° C. to about 180° C.; or from about 90° C. to about 160° C. In an embodiment herein, the density of the closed foam material is from about 0.1 g/cm$^3$ to about 0.5 g/cm$^3$; or from about 0.15 g/cm$^3$ to about 0.4 g/cm$^3$; or from about 0.175 g/cm$^3$ to about 0.35 g/cm$^3$. In an embodiment herein, the hardness of the layer is from about 20 to about 85; or from about 25 to about 75; or from about 30 to about 70.

Without intending to be limited by theory, it is believed that such a closed cell foam material temperature range balances desirable properties such as toughness, ability to permanently bond with the other helmet components, comfort, etc. Such materials are well-known in the art of helmet making, insulation, etc. and are available from multiple suppliers worldwide in varying grades and qualities.

In an embodiment herein, the surface area of the first surface aperture is greater than or equal to 25% of the corresponding first surface's surface area or from about 25% to about 95% of the corresponding first surface's surface area; or from about from about 35% to about 90% of the corresponding first surface's surface area; or from about 45% to about 85% of the corresponding first surface's surface area; or from about 50% to about 80% of the corresponding first surface's surface area. As used herein, the surface area of the corresponding first surface and/or the corresponding second surface is calculated as the total surface area, including the surface area of the apertures.

In an embodiment herein, the first surface is substantially parallel; or parallel, to the second surface. Typically the layer thickness is from about 0.5 mm to about 2 cm; or from about 1 mm to about 1.5 cm, or from about 2 mm to about 1.2 cm; or from about 0.3 to about 1 cm, as measured from the first surface to the second surface.

The first surface herein refers to the surface of the layer; or the plane formed by the top-most surface of the layer. In an embodiment herein, the first layer is intended to touch the user's body; or head, and/or to be the surface of the oblique-impact protection technology which is closest to the user's body; or head.

The first surface apertures herein have a square shape, as it is believed that such a shape provides improved benefits as compared to other shapes. Various shapes such as hexagonal, round, etc. were tested and overall it is believed that square shapes proved to be the most acceptable when various factors such as performance, force/torque absorption, comfort, etc. are considered. Without intending to be limited by theory, it is believed that during an oblique impact, the layer flexes and rotates around the user's body; or head, to reduce the force/torque transmitted thereto. In general, it is believed that shapes with corners allow the force to accumulate/concentrate at these locations during an oblique impact. In contrast, while a round first surface aperture shape would in theory avoid concentrating impact force, it was found that using round shapes provided too much surface area in-between the first surface apertures which made the layer uncomfortable and less effective.

Furthermore, it is believed that polygons such as hexagonal-shaped apertures contained too many corners (where the force/torque would be concentrated. Accordingly, it is believed that when the first aperture contains a square shape, this provides the optimal balance between, for example, force/torque reduction, comfort, breathability, etc. It is also believed that sharp corners may also unnecessarily concentrate force and therefore in an embodiment herein, the square shape contains a rounded corner; or four rounded corners.

The second surface is typically parallel to the first surface, and may contain a second surface aperture; or a plurality of second surface apertures. In an embodiment herein, the second surface aperture has a shape; or a shape selected from the group of a square, a circle, an oval, and a combination thereof; or a circle or an oval; or a circle.

The layer also contains a plurality of wells in the first surface, and each well corresponds to a first surface aperture. In essence, each first surface aperture forms the mouth of a well. It is believed that the well is very important as a greater proportion of well volume in the layer in turn results in thinner walls which are therefore able to flex and deform more so as to result in less force/torque transmitted to the user's body; or head. Thus, one skilled in the art must balance a greater well volume which results in reduced force/torque transmission, with factors such as comfort, the helmet (or other equipment) feeling secure and not slipping too much during regular use, etc.

In an embodiment herein, the oblique-impact protection technology reduces oblique-impact force/torque transmission by at least 10%; or from about 10% to about 50%; or from about 12% to about 45%; or from about 13% to about 40%, as compared to a similar helmet without the oblique-impact protection technology, as measured by a modified Regulation No. 22 test employing a 45° anvil instead of the normal flat and hemispherical anvils.

In an embodiment herein, in addition to reducing the oblique-impact force/torque transmission, the oblique-impact protection technology also reduces impact force transmission by at least 2%; or from about 2% to about 50%; or from about 3% to about 45%; or from about 4% to about 40%, as compared to a similar helmet without the oblique-impact protection technology, as measured by a Regulation No. 22 test employing a flat anvil (i.e., a traditional 90° impact), and/or a hemispherical anvil.

The well herein may go partially through the layer, in which case it is characterized as a closed well, or may go all the way through the layer in which case it is characterized as an open well. A closed well will typically possess a well depth of greater than or equal to 25% of the layer thickness; or from about 25% to about 99% of the layer thickness; or from about 35% to about 95% of the layer thickness; or from about 45% to about 90% of the layer thickness. The well depth is measured from the first surface; or the first surface plane, to the well floor, if a well floor is present (i.e., a closed well). Typically the well floor is the point of the well farthest from the first surface; or the first surface plane, as measured perpendicularly from the first surface; or the first surface plane, respectively. In cases where there is no well floor, because the well goes completely through the layer (e.g., the well is an open well), then the well depth is defined as 100%, and is equivalent to the layer thickness.

Therefore, in an embodiment herein, a well in the plurality of wells is a closed well; or at least 25% of the plurality of wells are closed wells; or at least 50% of the plurality of wells are closed wells; or wherein substantially all of the plurality of wells are closed wells; or all of the plurality of wells are closed wells.

In the case of an open well, one skilled in the art would understand that the well depth is 100% of the layer thickness as the well forms a passage that goes entirely through the layer. Therefore, in an embodiment containing an open well, the first surface aperture corresponds to a well, and the first surface aperture and/or a well also corresponds to a second surface aperture; in other words, an open well forms a passage that connects a first surface aperture to a corresponding second surface aperture. In an embodiment herein, a well in the plurality of wells is an open well and the well corresponds to a second surface aperture; or at least 25% of the plurality of wells correspond to a second surface aperture; or at least 50% of the plurality of wells correspond to a second surface aperture; or substantially all of the plurality of wells correspond to a second surface aperture; or all of the plurality of wells correspond to a second surface aperture.

In an embodiment herein, a well in the plurality of wells is an open well and the well corresponds to a second surface aperture and thereby forms a passage from the first surface to the second surface; or at least 25% of the plurality of wells corresponds to a second surface aperture and thereby form a plurality of passages from the first surface to the second surface; or wherein at least 50% of the plurality of wells corresponds to a second surface aperture and thereby form a plurality of passages from the first surface to the second surface; or wherein substantially all of the plurality of wells correspond to a second surface aperture and thereby form a plurality of passages from the first surface to the second surface; or wherein all of the plurality of wells correspond to a second surface aperture and thereby form a plurality of passages from the first surface to the second surface from the first surface to the second surface. In an embodiment herein, substantially all of the wells are open wells.

In an embodiment herein, the oblique-impact protection technology herein is included into a piece of sports equipment is selected from the group consisting of footwear, bodywear, a facemask, a helmet, a racquet, a club, and a combination thereof; or footwear, bodywear, a helmet, and a combination thereof. In an embodiment herein, the footwear useful herein may include, for example, shoes, sandals, etc.; or basketball shoes, running shoes, ski boots, etc. In an embodiment herein, the bodywear useful herein may include, for example, protective pads, clothing, a wetsuit, etc.; or shoulder pads, knee pads, shin pads, protective armor, etc. In an embodiment herein, the oblique-impact protection technology herein is included into a helmet, such as a sports helmet.

The helmet useful herein typically includes an impact-dissipating member and an oblique-impact protection technology either directly- or indirectly-affixed to the inner surface of the impact-dissipating member. The impact-dissipating member has an impact-dissipating member inner side and an impact-dissipating member outer side opposite the impact-dissipating member inner side. The impact-dissipating material useful herein is typically selected from a polystyrene, a polypropylene, and a mixture thereof, or from an extruded polystyrene, an expanded polystyrene; expanded polypropylene, and a mixture thereof; or an expanded polystyrene, and a mixture thereof.

An embodiment herein contains a shell external to, typically permanently bonded to, the impact-dissipating member outer side. The shell typically covers most, if not all of the impact-dissipating member outer side and serves multiple purposes such as aesthetics, additional impact dissipation, friction reduction, etc. In an embodiment herein the shell contains a shell material selected from a polycarbonate, a polystyrene, a polyacrylate and a mixture thereof; or from an extruded polystyrene, an expanded polystyrene, and a mixture thereof; or an expanded polystyrene; and a mixture thereof. While typically quite thin, the shell does contain a shell inner side and a shell outer side opposite to the shell inner side. The shell inner side is typically also permanently bound to the impact-dissipating member outer side during, for example, the in-moulding process. Alternately, the shell may be bound to the impact-dissipating member outer side after the formation thereof via an adhesive, or other methods known in the art.

The oblique-impact protection technology may be affixed to the impact-dissipating member and/or another helmet portion via, for example, a technique selected from the group consisting of adhesion, in-moulding, heat fusion, ultrasonic fusion, and a combination thereof; or in-moulding. See, for example, the general helmet description as well as process-related information found in US 2015/01137709 A1 to Cheng, published on Apr. 30, 2015.

Manufacturing Process:

The process for making the helmets herein typically includes providing a female mould portion, providing a male mould portion, providing an oblique-impact protection technology member containing the oblique-impact protection technology herein, and providing an impact-dissipating material. The male mould portion is complementary to the female mould portion and therefore the female mould portion and the male mould portion are able to be fit together so that they form a hollow mould therebetween. Either before the male mould portion and the female mould portions are fitted together, or after the male mould portion and the female mould portions are fitted together the oblique-impact protection technology member is applied to the male portion.

The impact-dissipating material may be applied to the hollow mould in the form of a liquid or a plurality of beads; or as a plurality of beads. The oblique-impact protection technology member and the impact-dissipating material are subject to an in-moulding process within the hollow mould. In the process herein the impact dissipating material forms an impact-dissipating member having an impact-dissipating member inner side and an impact-dissipating member outer side opposite from the impact dissipating member inner side. The in-moulding process permanently binds the oblique-impact protection technology member, typically the outer side of the oblique-impact protection technology member, to the impact-dissipating member inner side. Additional other parts may be also formed into, onto, or by the various helmet components at this time, for example, a shell, an attachment area, a frame, a reflector, etc. In an embodiment herein the shell material is provided and applied to the female mould portion prior, typically prior to, or during the in-moulding process. In this embodiment, the shell material forms a shell and the in-moulding process permanently binds the shell; or the shell inner side, to the impact-dissipating member outer side.

The in-moulding processes and machinery will typically conduct the in-moulding process at a temperature of from about 65° C. to about 250° C., or from about 80° C. to about 180° C., or from about 90° C. to about 160° C. Such processes and the associated machinery are well-known in the art and available from a variety of manufacturers worldwide.

The oblique-impact protection technology member may be formed from a closed cell foam, from a closed cell foam material, and/or from one or more closed cell foam precursor(s) by methods known in the art such as, for example, vacuum forming, blowing, etc.

FIGURES

Turning to the Figures, FIG. 1 is a cut-away side view of an embodiment of a helmet, 10, according to the present invention. The helmet, 10, will typically further contain a complementary or mirror-image left side view as well, but which is not shown here for simplicity's sake. The helmet, 10, is an example of a type of sports equipment, 12, and has an oblique-impact protection technology member, 20, which has an oblique-impact protection technology member inner side, 22, and an oblique-impact protection technology member outer side, 24. The oblique-impact protection technology member outer side, 24, is opposite (i.e., on the opposite side of) the oblique-impact protection technology member inner side, 22.

The helmet, 10, also contains an impact-dissipating member, 26, formed of an impact dissipating material. The helmet, 10, contains a hole, 28, which allows air to flow through the helmet, 10, when it is worn, thereby increasing user comfort and ventilation. The helmet, 10, will often contain a plurality of holes, 28, winch also lower the weight of the helmet and reduce the amount of raw materials used and production costs. Multiple ribs, 30, run between and bound the holes, 28, and these are made from the impact-dissipating material. The ribs, 30, therefore form the structural basis for the impact-dissipating members, 26, of the helmet, 10. Multiple oblique-impact protection technology members, 20, are found in the interior of the helmet, 10, each of them permanently affixed to; or permanently-bound to; or in-moulded to, the impact-dissipating member, 26, oftentimes at the ribs, 30, in between the holes, 28. Specifically, the oblique-impact protection technology member outer side, 24, is typically in-moulded to the impact-dissipating member, 26, at the rib, 30. The impact-dissipating member, 26, contains an impact-dissipating member outer side, 34.

The helmet, 30, also contains a shell, 32, external to the impact-dissipating member, 26 and covers much of the impact dissipating member, 26. The shell, 32, has a shell inner side, 36, is permanently bound to the impact-dissipating member outer side, 34. The shell outer side, 38 is open to the air and the farthest portion of the helmet from the user's head (not shown).

The helmet, 10, has an additional feature, 40, also in-moulded to the impact-dissipating member, 26. In this case the additional feature is a buckle for attaching, for example, a chin strap (not shown). The helmet, 10, also contains another additional feature, 40', which in this case is a threaded hole for a screw which may be used to attach, for example, an insert for wearers with smaller-sized heads, etc.

Figure 2:
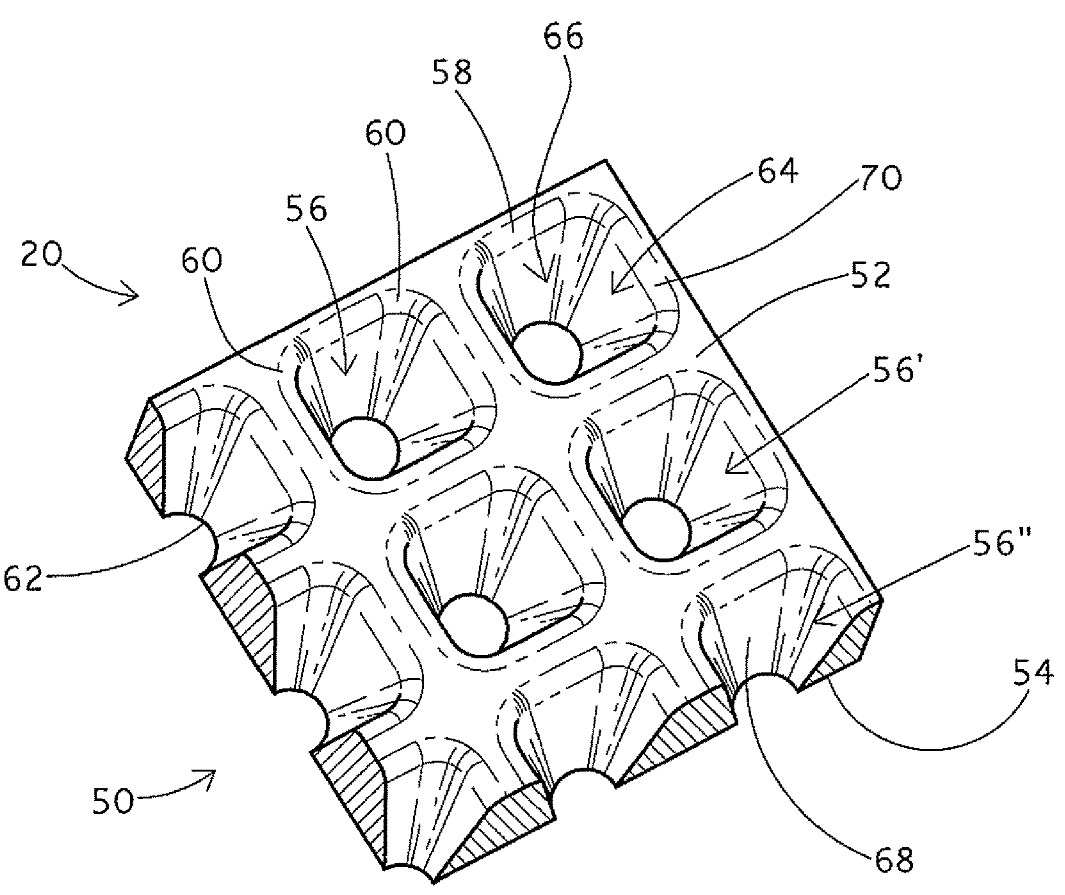
FIG. 2 shows a partial, top perspective close-up view of an embodiment of the oblique-impact protection technology member.

FIG. 2 shows a partial, top perspective close-up view of an embodiment of the oblique-impact protection technology member, 20, useful herein. The oblique-impact protection technology member, 20, is formed of a layer, 50, of a closed cell foam and contains a first surface, 52, and a second surface, 54. One skilled in the art understands that only a small part of the layer, 50, is shown in FIG. 2. The first surface, 52, contains a plurality of wells, 56. In FIG. 1, each well, 56, corresponds to a first surface aperture, 58, each of which has a square shape with four rounded corners, 60. When the layer, 50, is attached to, for example, a piece of sports equipment (see FIG. 1 at 12) or a helmet (see FIG. 1 at 10), then it would typically be the second surface, 54, which is attached to the piece of sports equipment (see FIG. 1 at 12) or a helmet (see FIG. 1 at 10). In this embodiment, it can be seen that all of the wells, 56, are identical in shape and size, that all of the first surface apertures, 58, are identical in shape and size, and all of the second surface apertures, 62, are identical in shape and size.

In FIG. 2, each second surface aperture, 62, corresponds to a first surface aperture, 58, and each corresponding well, 56, in this case, an open well, 64, forms a passage, 66, between the first surface, 52, and the second surface, 54. It can be seen that between the well, 56' and well 56", is a well wall, 68, which provides structural integrity to the layer. 50, and also flexes and/or deforms upon oblique-impact so as to reduce the force/torque transmitted to the user. It can also be seen that in this embodiment, the transition between the first surface aperture, 58, and the well, 56, contains a rounded edge, 70, which makes manufacture of the layer, 50, easier, and also may provide greater comfort to the user.

Figure 3:
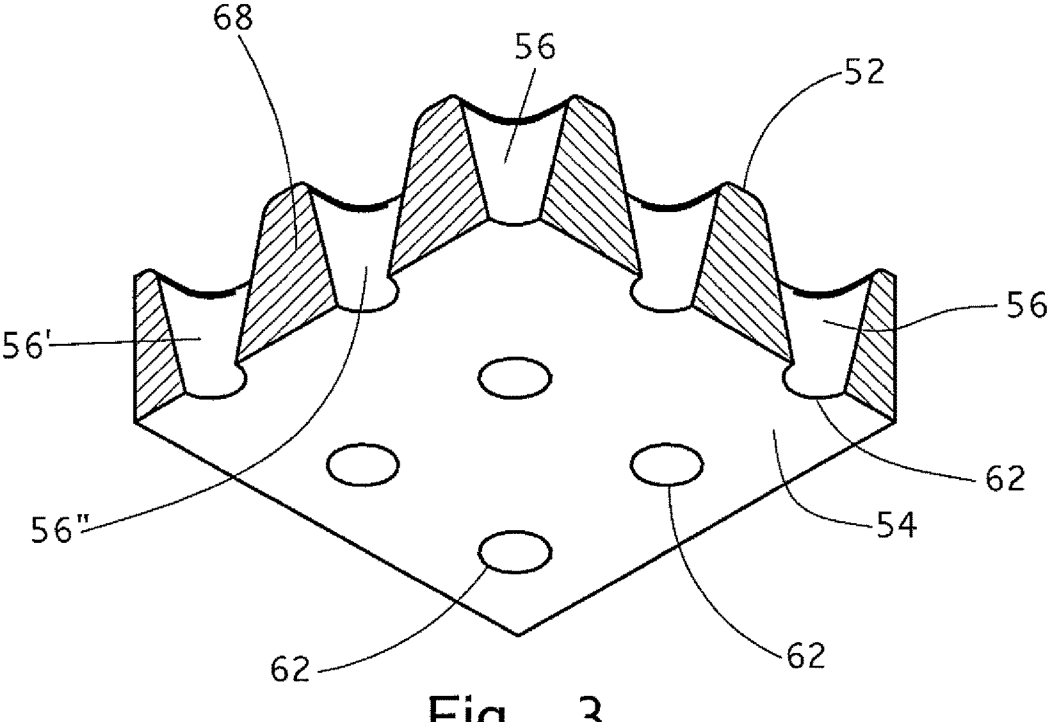
FIG. 3 shows a partial, bottom perspective close-up view of an embodiment of the oblique-impact protection technology member.

FIG. 3 shows a partial, bottom perspective close-up view of an embodiment of the oblique-impact protection technology member. 20, useful herein. This figure clearly shows the second surface, 54, containing a plurality of second surface apertures, 62, and a plurality of wells, 56, 56', 56". The first surface, 52, is opposite the second surface, 54. FIG. 3 also clearly shows that a well wall, 68, is formed between the well 56', and the well 56".

Figures 4, 5:
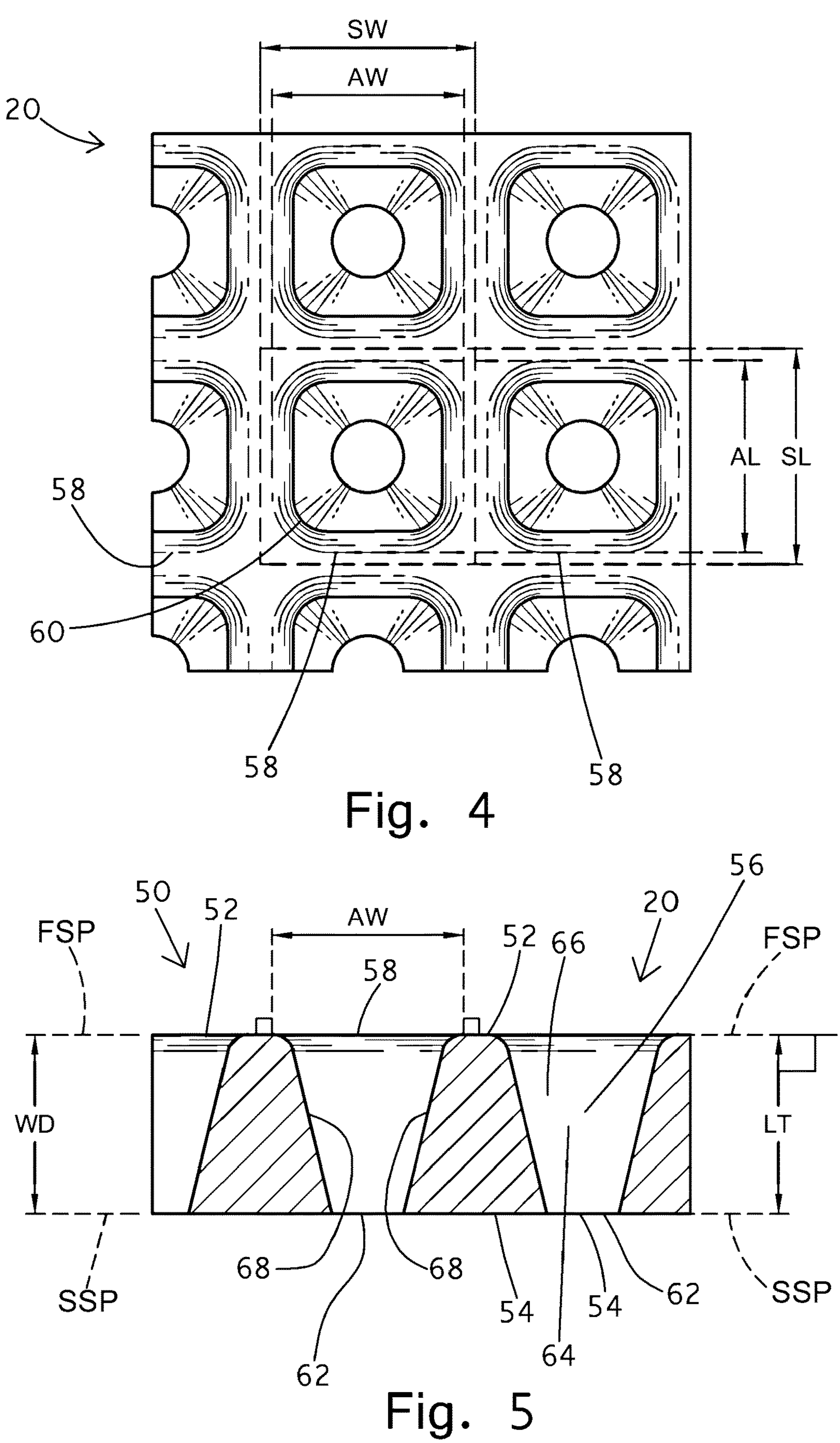
FIG. 4 shows a partial, top view of the embodiment of the oblique-impact protection technology member of FIG. 1.
FIG. 5 shows a partial, side view of the embodiment of the oblique-impact protection technology member of FIG. 1 and FIG. 4.

FIG. 4 shows a partial, top view of the embodiment of the oblique-impact protection technology member, 20, of FIG. 1. This figure looks upon the first surface, 52, and clearly shows the first surface aperture, 58. The surface area of the square-shaped first surface aperture, 58, may be calculated by measuring the first surface aperture width, AW, and the first surface aperture length, AL, multiplying them, and subtracting the surface area between the corresponding rounded corners, 60. The surface area of other non-square-shaped surface apertures may be similarly-calculated via geometric principles and/or formulas known in the art, or via a Computer Aided Design (CAD) program. In FIG. 4, the first surface aperture width, AW, is the farthest distance between any opposing edges, while the first surface aperture length is measured as the furthest distance between any opposing edges, perpendicular to the direction of the first surface aperture width. Similarly, the corresponding first surface's surface area may be calculated by measuring the distance from the midpoint between each first surface aperture, 58, to find the first surface width. SA, and the first surface length, SL, an then multiplying the first surface width, SA, and the first surface length, SL.

FIG. 5 shows a partial, side view of the embodiment of the oblique-impact protection technology member, 20, of FIG. 1 and FIG. 4. This figure shows that the first surface, 52, forms a first surface plane, FSP, while the second surface. 54, forms a second surface plane. SSP, which is parallel to the first surface plane, FSP. It is also clear that the first surface aperture width, AW, of the first surface aperture, 58, is measured from the (opposing) points at which the first surface aperture, 58, breaks the first surface plane, FSP, rather than from some point on the well walls, 68. Also, just for clarity, it is indicated that the first surface aperture width, AW, is measured at an angle perpendicular to the first surface plane, FSP.

The layer thickness, LT, is the distance between the first surface plane, FSP, and the second surface plane, SSP, as measured perpendicular to the first surface plane, FSP, and in FIG. 5 this is shown as being substantially the same throughout the layer, 50. In this figure, it can also be seen that the well depth, WD, is equal to 100% of the of the layer thickness, LT, as the well, 56, is an open well, 64, which forms a passage, 66, from the first surface (and the first surface plane, FSP) to the second surface (and the second surface plane, SSP). In this figure, a plurality of second surface apertures, 62, may also be seen.

Figure 6:
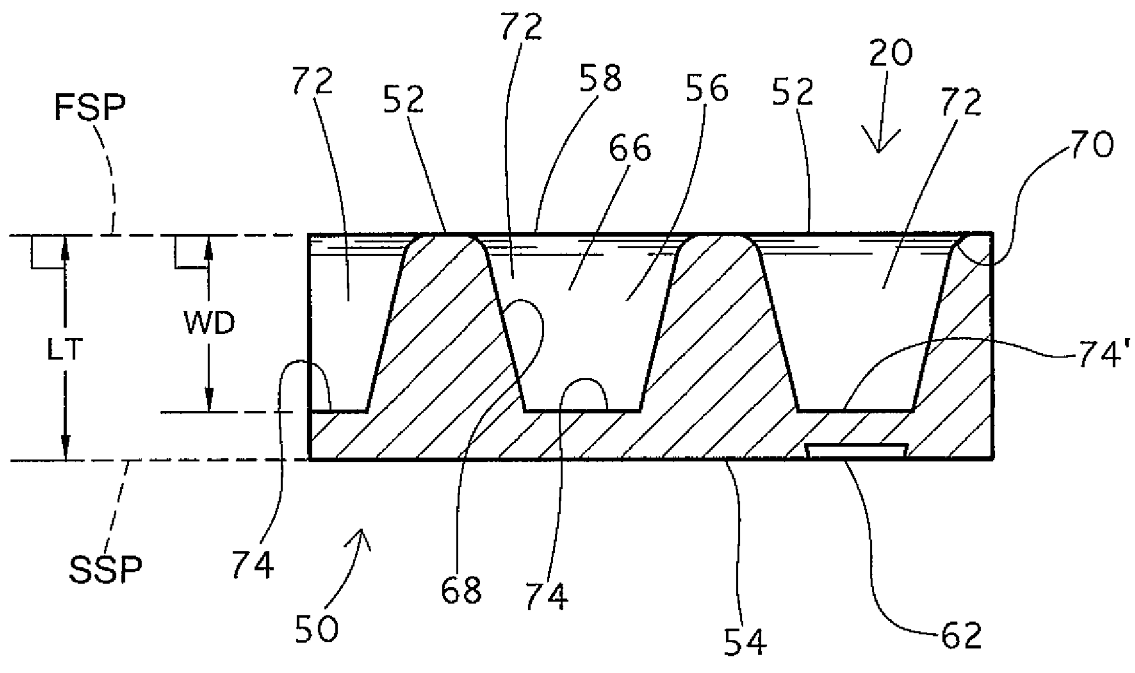
FIG. 6 shows a partial, side view of the embodiment of the oblique-impact protection technology member.

FIG. 6 shows a partial, side view of the embodiment of the oblique-impact protection technology member, 20. This figure shows a layer, 50, with a first surface, 52, and a second surface, 54, opposite the first surface, 52. A first surface aperture, 58, on the first surface, 52, corresponds to a well, 56, having a well wall, 68. The first surface, 52, forms a first surface plane, FSP, and the second surface, 54, forms a second surface plane, SSP.

However, in this embodiment, each of the wells, 56, is a closed well, 72, having a rounded edge, 70, and a well floor, 74. A shallow second surface aperture, 62, is indicated in this embodiment, although the second surface aperture, 62, does not connect with, or form a passage (see FIG. 4 at 66) with, the first surface aperture, 52, as a well floor, 74, is present.

Figure 7:
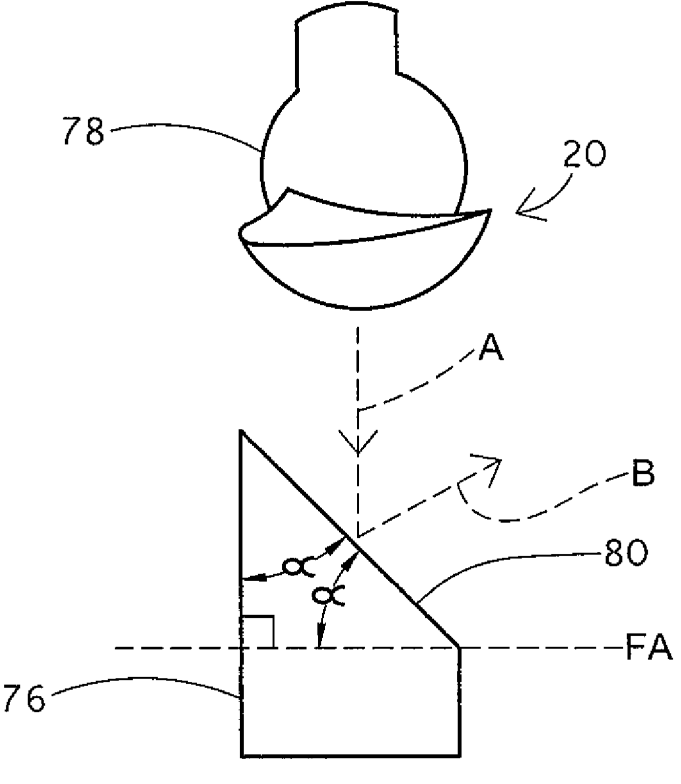
FIG. 7 is a schematic diagram of a 450 anvil and related helmet testing.

FIG. 7 is a schematic diagram of a 45° anvil, 76, and related helmet testing. The helmet, 20, is securely-attached to a headform, 78, and accelerated in a direction indicated by arrow A at a controlled manner towards the 45° anvil, 76. The 45° anvil, 76, has an impact surface, 80, angled at an angle, a, which is 45° relative to the dropping direction of arrow A, and also 45° relative to the normal flat anvil surface, FA.

Upon impact, the helmet, 20, rebounds from the impact surface. 80, in a direction as generally indicated by arrow B.

Testing Process:

Testing of the helmets herein for oblique impact performance are conducted using industry standard machinery such as described in, for example, Regulation No. 22, except that the anvil is a 45° anvil, which is an anvil having an impact surface which is angled 45° (e.g., "Modified Regulation No. 22 test with 45° anvil") from the normal flat anvil used in the normal Regulation No. 22 test. See, for example, FIG. 7. The headform contains a sensor (for example, an accelerometer); or a plurality of sensors, therein to measure the speed, acceleration, etc. of the headform in 3 dimensions. In addition, a high-speed camera may also be present to record the test.

EXAMPLES

Example 1

An oblique-impact protection material is manufactured from a closed cell foam material and affixed to a pre-formed helmet via an industry-standard contact adhesive and labelled as Helmet A. An identical helmet is manufactured except that it lacks the oblique-impact protection material and is labelled Comparative Helmet A1. A comparable helmet containing the MIPS system is manufactured and is labelled Comparative Helmet A2.

In regular Regulation No. 22 tests using both flat and hemispherical anvils and dropped from a height of 205 cm, the average Peak G value of Helmet A is 4.7% less than Comparative Helmet A1 and 2.4% less than Comparative Helmet A2. Accordingly, this data shows that the present invention provides improved linear impact protection (i.e., less force transmission) as compared to the comparative helmets.

Example 2

An oblique-impact protection material is manufactured from a closed cell foam material and affixed to a pre-formed helmet via an industry-standard contact adhesive and labelled as Helmet B. An identical helmet is manufactured except that it lacks the oblique-impact protection material and is labelled Comparative Helmet B1. A comparable helmet containing the MIPS system is manufactured and is labelled Comparative Helmet B2. A comparable helmet containing KALI's LDL system is manufactured and is labelled Comparative Helmet B3.

These helmets were tested using the Modified Regulation No. 22 test with a 45° anvil as described herein and dropped from a height of 210 cm. The data collected included frontal, X-axis rotation, Y-axis rotation, Z-axis rotation, Occipital, and lateral-R measurements from the headform (measured in radians/second$^2$). The average rotation for Helmet B is 14.1% less than Comparative Helmet B1, 3.3% less than Comparative Helmet B2, and 7.5% less than Comparative Helmet B3. Accordingly, this data shows that the present invention provides improved rotational impact protection (i.e., less force/torque transmission) as compared to the comparative helmets.

Example 3

An oblique-impact protection material is manufactured from a closed cell foam material and affixed to a pre-formed helmet via an industry-standard contact adhesive and labelled as Helmet C. An identical helmet is manufactured except that it lacks the oblique-impact protection material and is labelled Comparative Helmet C1. A comparable helmet containing the MIPS system is manufactured and is labelled Comparative Helmet C2.

These helmets were tested using the Modified Regulation No. 22 test with 45° anvil described herein and dropped from a height of 210 cm. The data collected included front, rear, left, right, and top measurements from the headform (measured in radians/second$^2$). The average rotation for Helmet B is 15.5% less than Comparative Helmet C1, and 15.7% less than Comparative Helmet C2. Accordingly, this data shows that the present invention provides improved rotational impact protection (i.e., less force/torque transmission) as compared to the comparative helmets.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable subcombination.

All references specifically cited herein are hereby incorporated by reference in their entireties. However, the citation or incorporation of such a reference is not necessarily an admission as to its appropriateness, citability, and/or availability as prior art to/against the present invention.

What is claimed is:

1. A helmet comprising (a) a shell having a shell inner side and a shell outer side opposite to the shell inner side; and (b) an oblique-impact protection technology member affixed to an inside portion of the helmet, the oblique-impact protection technology member comprising a layer of closed cell foam comprising:

i) a first surface in contact with a head of a user during use, the first surface consisting of a plurality of first surface apertures, wherein the plurality of first surface apertures comprise a plurality of square-shaped apertures;

ii) a second surface opposite and substantially parallel to the first surface, the second surface consisting of a plurality of second surface apertures; and iii) a plurality of wells in the first surface, the plurality of wells comprising a plurality of open wells, wherein each open well corresponds to one of the plurality of square-shaped apertures and to one of the plurality of second surface apertures, and forms a passage having a tapered shape extending from the first surface to the second surface.

2. The helmet according to claim 1, wherein the plurality of first surface apertures further comprises a plurality of third surface apertures in the first surface, and the plurality of wells further comprise a plurality of closed wells, wherein each of the plurality of closed wells corresponds to one of the plurality of the third surface apertures and extends from the first surface partially through the layer of closed cell foam to a closed well depth greater than or equal to 25% of the layer thickness.

3. The helmet according to claim 1, wherein the layer thickness is from about 0.5 mm to about 2 cm.

4. The helmet according to claim 1, wherein the square shape of the plurality of square-shaped apertures comprises a rounded corner.

5. The helmet according to claim 4, wherein the oblique-impact protection technology member reduces oblique-impact force/torque transmission by at least 10% as compared to a similar helmet without the oblique-impact protection technology member.

6. The helmet according to claim 1, wherein the closed cell foam comprises a closed cell foam material selected from the group consisting of a foam rubber, a polyurethane foam, a polyethylene foam, an ethylene vinyl acetate foam, a latex foam, a polyvinyl chloride foam, a vinyl nitrile foam, and a combination thereof.

7. A piece of sports equipment comprising the helmet according to claim 1.

8. The helmet according to claim 1, wherein at least 50% of the plurality of first surface apertures consist of the plurality of square-shaped apertures corresponding to the plurality of open wells.

9. The helmet according to claim 8, wherein the layer thickness is from about 0.5 mm to about 2 cm, and wherein the square shape of the square-shaped surface aperture comprises four rounded corners.

10. The helmet according to claim 1, wherein a surface area of the plurality of first surface apertures is greater than or equal to 25% of a surface area of the first surface.

11. The helmet according to claim 10, wherein the area of the plurality of first surface apertures is about 35% to about 90% of the area of the first surface.

12. The helmet according to claim 10, wherein the surface area of the plurality of first surface apertures is from 25% to about 95% of the surface area of the first surface.

13. The helmet according to claim 1, wherein the second surface aperture has a circle shape, an oval shape, or a combination thereof.

14. The helmet according to claim 1, wherein the oblique-impact protection technology member consists essentially of the layer of closed cell foam, which consists essentially of the first surface, the second surface, and the plurality of open wells.

15. The helmet according to claim 1, wherein the helmet further comprises an impact-dissipating member bound to the shell inner side of the helmet, and the oblique-impact protection technology member is affixed to the impact-dissipating member.

16. The helmet according to claim 1, wherein the shell comprises a shell material selected from the group consisting of a polycarbonate, a polystyrene, a polyacrylate, and a mixture thereof.

17. A process for manufacturing a helmet comprising the steps of:

A. providing a female mould portion;

B. providing a male mould portion complementary to the female mould portion wherein the female mould portion and the male mould portion are able to fit together to form a hollow mould therebetween;

C. providing an oblique-impact protection technology member comprising a layer of closed cell foam comprising:

i) a first surface in contact with a head of a user during use, the first surface consisting of a plurality of first surface apertures, wherein the plurality of first surface apertures comprise a plurality of square-shaped apertures;

ii) a second surface opposite and substantially parallel to the first surface, the second surface consisting of a plurality of second surface apertures; and (iii) a plurality of wells in the first surface, the plurality of wells comprising a plurality of open wells, wherein each open well corresponds to one of the plurality of square-shaped apertures and to one of the plurality of second surface apertures, and forms a passage having a tapered shape extending from the first surface to the second surface;

D. applying the oblique-impact protection technology member to the male mould portion;

E. providing an impact-dissipating material and applying the impact-dissipating material into the hollow mould;

F. subjecting the oblique-impact protection technology member and the impact-dissipating material to an in-moulding process within the hollow mould;

wherein the oblique-impact protection technology member comprises an oblique-impact protection technology member inner side, wherein the oblique-impact protection technology member comprises an oblique-impact protection technology member outer side opposite the oblique-impact protection technology member inner side, wherein the impact dissipating material forms an impact-dissipating member comprising an impact-dissipating member inner side, wherein the impact-dissipating member comprises an impact dissipating member outer side opposite the impact dissipating member inner side, and wherein the in-moulding process permanently binds the oblique-impact protection technology member outer side to the impact-dissipating member inner side;

G. providing a shell having a shell inner side and a shell outer side opposite to the shell inner side; and H. bonding the outer side of the impact-dissipating member to the shell inner side of the shell.

18. The process for manufacturing a helmet according to claim 17, wherein the in-moulding process is conducted at a temperature of from about 65° C. to about 250° C.

* * * * *